United States Patent
Shaham et al.

(10) Patent No.: US 8,743,424 B2
(45) Date of Patent: Jun. 3, 2014

(54) PRE-PRINT ENHANCEMENT OF A RASTER IMAGE

(75) Inventors: Noam Shaham, Mazkeret Batya (IL); Gideon Amir, Ness Ziona (IL); David Ben-Ovadia, Tel-Aviv (IL); Ram Dagan, Modiin (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 640 days.

(21) Appl. No.: 12/818,910

(22) Filed: Jun. 18, 2010

(65) Prior Publication Data
US 2011/0310438 A1   Dec. 22, 2011

(51) Int. Cl.
*H04N 1/40* (2006.01)
*G06K 9/34* (2006.01)

(52) U.S. Cl.
USPC .......... 358/3.24; 358/1.9; 358/3.27; 382/176; 382/266; 382/274

(58) Field of Classification Search
None
See application file for complete search history.

(56) References Cited

U.S. PATENT DOCUMENTS

| 5,731,823 | A  * | 3/1998  | Miller et al. ....................... 347/5 |
| 6,057,935 | A  * | 5/2000  | Freeman |
| 7,085,000 | B2   | 8/2006  | Coleman |
| 7,268,916 | B2   | 9/2007  | Kokemohr et al. |
| 7,433,517 | B2 * | 10/2008 | Kato et al. .................... 382/180 |
| 7,440,123 | B2   | 10/2008 | Chodagiri et al. |
| 7,616,349 | B2   | 11/2009 | Vittitoe |
| 7,719,546 | B1 * | 5/2010  | Yhann et al. .................. 345/629 |
| 8,284,445 | B2 * | 10/2012 | Tsunoda ........................ 358/1.9 |
| 2003/0160981 | A1 * | 8/2003 | Shannon ........................ 358/1.9 |
| 2008/0007752 | A1 | 1/2008 | Gandhi et al. |
| 2010/0158360 | A1 * | 6/2010 | Dai ............................. 382/164 |

OTHER PUBLICATIONS

Hasib Siddiqui et al "Hardware-friendly Descreening" vol. 19, Oct. 12-15, 2008 pp. 1740-1743.

* cited by examiner

*Primary Examiner* — Steven Kau

(57) ABSTRACT

A method for pre-print enhancement of a raster image is disclosed. The method includes
receiving the raster image, categorizing an element in the raster image as a graphical element or an image element; and if the element is categorized as a graphical element applying graphical enhancement to the graphical element. A computer program product for pre-print enhancement of a raster image is also disclosed.

17 Claims, 4 Drawing Sheets

PRE-PRINT ENHANCEMENT OF A RASTER IMAGE

FIELD OF THE INVENTION

The present invention relates to printing. More specifically the present invention relates to pre-print enhancement of a raster image.

BACKGROUND

Typical page in its source form may contain both graphical and image elements.

A graphical element is usually characterized as being in the form of vector-based data, which defines the exact shape and position of the graphical element on a printed material. For example, fonts are usually classified as graphical data. Line art is another example of graphical data.

Image data, on the other hand, is typically raster data in a specific resolution, represented in a bitmap format (in many instances it may be represented in a compressed format, for example, JPEG). Typically, the source of the image data is an image capturing device such as digital camera or a scanner.

A RIP (raster image processing) software application is used to put together graphical and image elements on a page in its source form. The RIP application then rasters and flattens the graphical and image elements according the printing device resolution and color planes (typically CMYK).

At this point trapping may be performed. Trapping is done on the graphical edges according to their rendered CMYK mix. The RIP application may easily do it, as it already has information on the location of graphical edges. The page is than sent to a printer, printed and reviewed. According to the result, the operator may decide to add or change image enhancement (e.g. sharpening) or trapping parameters. In this case the page is returned back to the enhancement and authoring tools and the RIP module—all of which are time and resource consuming.

Trapping and image enhancement require the RIP application to have the ability and knowledge to parse the specific format of the page (e.g. PDF, Postscript). Furthermore, it is advantageous to know the printing properties of the specific printer on which the specific page is to be printed, and in particular the actual misregistration properties of that specific printer, for successful trapping.

However many times the editor of the page cannot anticipate on which printer the page will eventually be printed, nor has any control of that printer. In other cases, the editor is not an expert in printing and is not aware of the potential misregistration effect. Such an inexperienced user may choose color schemes that are inherently susceptible to misregistration, Thus misregistration artifacts are widely found in many printed pages. Misregistration is usually more noticeable when occurring at the location of graphical elements on the page, but beyond a visible threshold it may also be visible on the image parts of the page. On the other hand, if trapping is carried out on a page with image elements this alone can cause artifacts to appear on the image elements.

SUMMARY

According to embodiments of the present invention there is provided a method for pre-print enhancement of a raster image. The method includes receiving the raster image, performing image analysis on the raster image to categorize an element in the raster image as a graphical element or an image element, and if the element is categorized as a graphical element applying graphical enhancement to the graphical element.

Furthermore, according to embodiments of the present invention, there is provided a computer program product stored on a non-transitory tangible computer readable storage medium for pre-print enhancement of a raster image. The computer program including code for receiving the raster image, performing image analysis on the raster image to categorize an element in the raster image as a graphical element or an image element, and if the element is categorized as a graphical element applying graphical enhancement to the graphical element.

Furthermore, according to embodiments of the present invention, there is provided a system for pre-print enhancement of a raster image. The system includes an input interface for receiving the raster image, an image analyzer for performing image analysis on the raster image to categorize an element in the raster image as a graphical element or an image element, and an image enhancer for applying graphical enhancement to the graphical element if the element is categorized as a graphical element.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. It should be noted that the figures are given as examples only and in no way limit the scope of the invention. Like components are denoted by like reference numerals.

DETAILED DESCRIPTION

According to embodiments of the present invention, a method for pre-print enhancement of a raster image is hereinafter described. The method includes receiving a raster image, performing image analysis on the raster image to categorize an element in the raster image as a graphical element or an image element; and if the element is categorized as a graphical element applying graphical enhancement to the graphical element.

According to embodiments of the present invention a method for performing trapping on a page with graphical and image elements is described, which involves performing image analysis on a raster page image just before it is printed, or saved for printing, as explained hereinafter.

Regardless of the document format from which the page image raster initially originated embodiments of the present invention deal with a pre-print enhancement performed on a raster image of the page, which is a bitmap format representation of the page.

Figure 1:
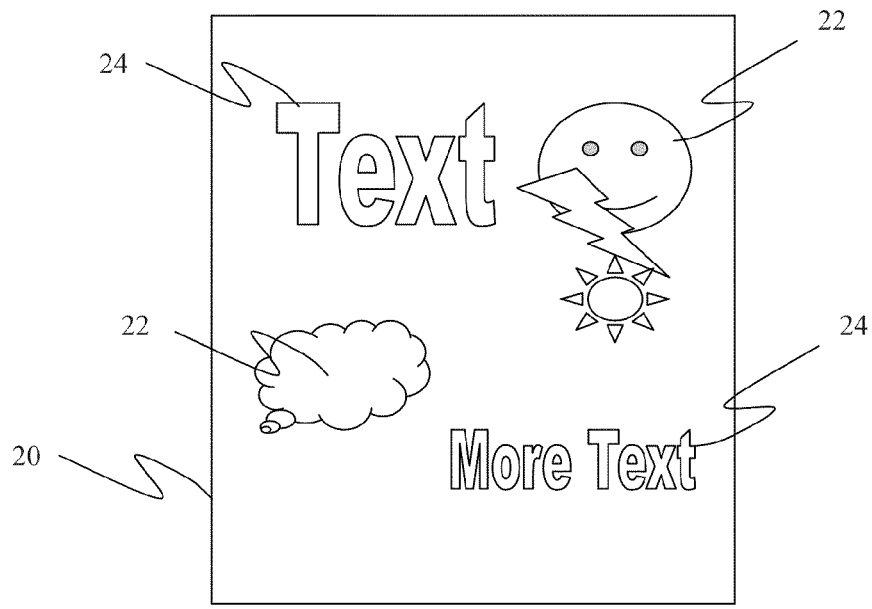
FIG. 1 illustrates a page design with graphical image elements.

Reference is made to FIG. 1, illustrating a page design with graphical image elements. Typically page 20 may include graphical elements 24 and image elements 22. The representations of image elements 22 in this figure are in fact of graphical nature and are provided for illustrative purpose only. An image element typically has a plurality of pixels having a plurality of different values, representing color (and luminance). Graphical elements have a substantially smaller diversity of pixel values.

Figure 2:
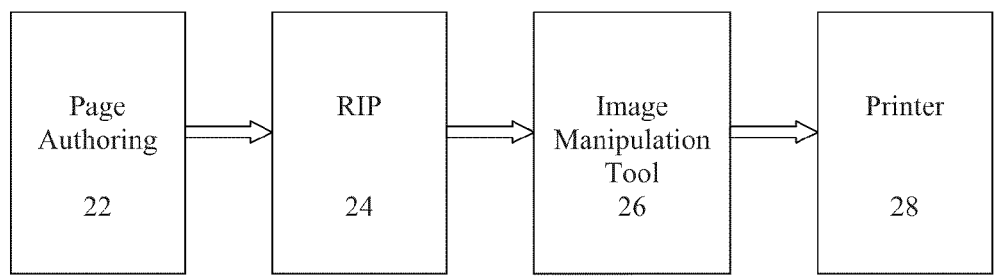
FIG. 2 illustrates a process flow from authoring a page to printing the page, in accordance with embodiments of the present invention.

FIG. 2 illustrates a process flow from authoring a page to printing the page, in accordance with embodiments of the present invention. A page may initially be designed using a page authoring application (e.g. Photoshop™). The design is saved in a document format (e.g. PDF, Postscript). The document is then processed by a RIP which performs rasterization of the page resulting in a raster image which is a bitmap representation of the page. This raster image may now be printed by a printer. According to embodiments of the present invention a pre-print enhancement is performed in the raster page image before it is printed or saved for future printing. The pre-print enhancement according to embodiments of the present invention is carried out by an image manipulation tool 26, and the enhanced page image is printed by printer 28.

A pre-print enhancement of raster image according to embodiments of the present invention is hereby explained with reference to FIG. 3.

Figure 3:
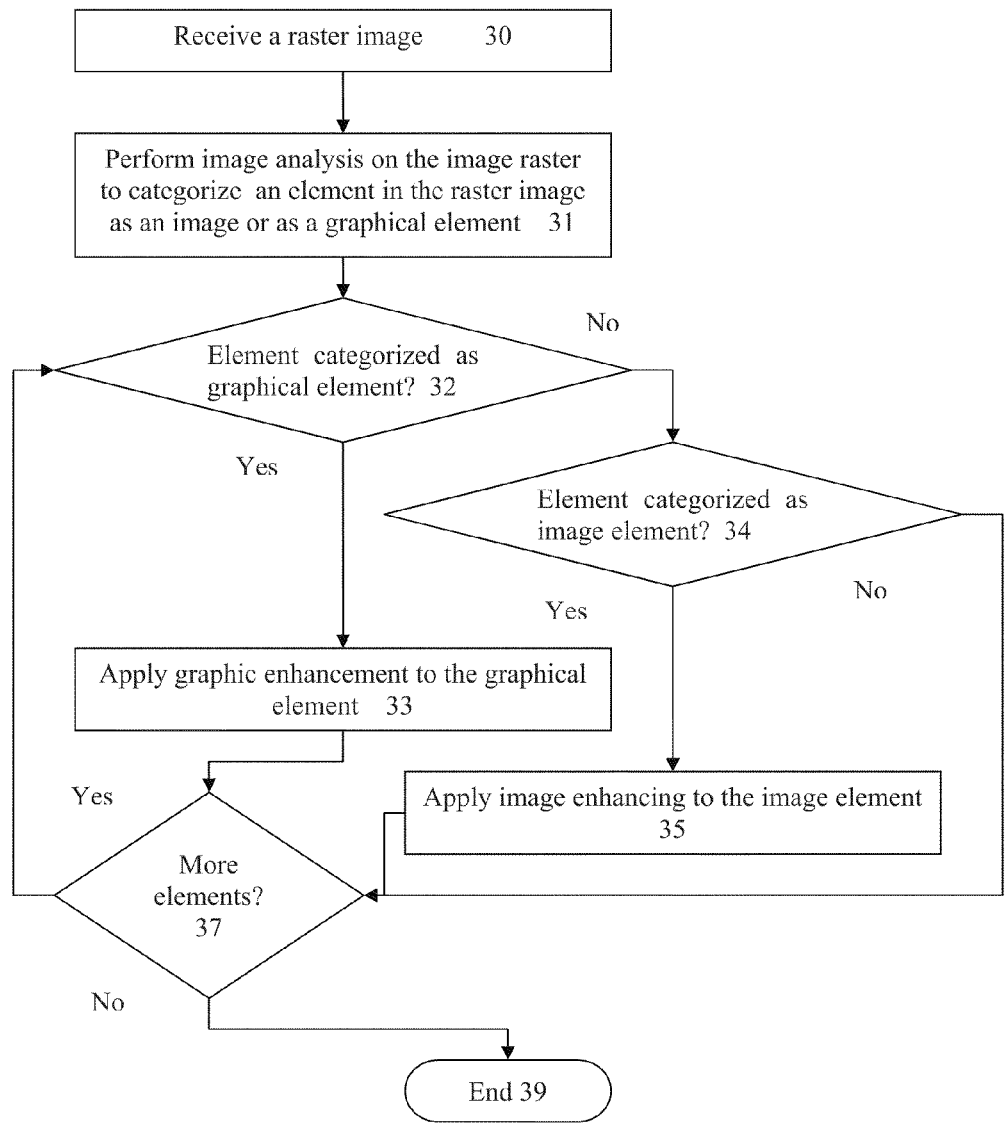
FIG. 3 is a flow chart of an algorithm for pre-print enhancement of a raster page image, according to embodiments of the present invention.

FIG. 3 is a flow chart of an algorithm for pre-print enhancement of a raster page image, according to embodiments of the present invention.

The image manipulation tool receives the raster image 30 and elements of the raster image undergo image analysis to determine whether they are graphical elements or image elements, thus determining the existence and location of image elements and graphical elements in the raster image 31. If an element is categorized as a graphical element 32 graphical enhancement is applied to that element 33. If the element is categorized as an image element 34 image enhancement is applied to that element 35. It is then determined whether there are more elements which were not processed yet 37, and if there are still more elements the above steps are repeated. Else the algorithm comes to its end 39. The image analysis may include analyzing single pixels or pixel groups in the image raster to determine whether they belong to a graphical element or to an image element to identify graphical or image elements present in the raster image.

Graphical enhancement may include trapping but also other graphical enhancement operations, such as for example applying specific halftoning which is suitable for such graphical element. Image data and graphical data may be subjected to different halftoning schemes, depending on their type (image or graphical elements).

Thus, instead of performing graphical enhancement, such as trapping on the entire image (or other global graphical enhancement), only the graphical elements undergo this treatment rather than performing it on the entire image.

According to embodiments of the present invention image enhancing operations (e.g. sharpening) may also be performed on the image elements of the page, after the location of these elements is determined.

Trapping is usually done for a defined graphics data, which can easily identified by the RIP processor in its vector representation. Image enhancement (e.g. sharpening, color balance, level adjustment or other image enhancement operation) may be performed on identified image elements (in many cases in a compressed domain, like, for example, in JPEG format). Applying graphical enhancement and image enhancement to a page involves parsing the page in its original form (e.g. Adobe PDF, Postscript, and Microsoft documents), identifying and locating the graphics and image elements, and performing graphical enhancement and image enhancement accordingly.

For sake of brevity graphical enhancement is hereinafter referred to as "trapping", yet it should be taken to include other graphical enhancement operations as well.

It is advantageous, therefore, to perform trapping and image enhancement by the page parser. By way of example, trapping and sharpening functions at a post RIP CMYK data format are described hereinafter.

Images are used directly by the page authoring tool, which in turn prepares the job file. The job file is rasterized by the RIP application to the resolution of the printer and the ink colors used (typically CMYK). According to embodiments of the present invention the solution is implemented by an image manipulation tool, which may be an application run by a printer system, or a separate computing device, which may or may not be connected to the printer. The page image which undergoes pre-print enhancement according to embodiments of the present invention may be then printed or saved to be printed at a later time.

The image manipulation tool may be setup by a user, who sets the desired levels of sharpening and trapping, and the image manipulation tool utilizes predefined sets of parameters to obtain the desired results. The tool setup may be different from job to job, and work may be done automatically according to job ticket/properties or job definitions. After sharpening and trapping are applied to the page, the page is sent to the printing device for print and review. In case the user would like to change the levels of sharpening and trapping, the change may be done very quickly without having to go back to the authoring tools and RIP.

According to embodiments of the present invention the proposed pre-print enhancement of a raster image introduces advantages, some of which include:

The proposed solution provides good results regardless of the input file format and the RIP type.

Image enhancement (like sharpening for example) and trapping parameters may be adjusted very quickly without having to repeat enhancement, authoring and RIP tools use, thus saving time and manpower.

The categorization of elements in the raster image as image or graphical elements may be carried out in the pixel level. A raster image is a matrix of pixel values. A pixel value is defined as a vector of color component scalar values. Any pixel in the raster image may be categorized into one of the following types: image, which refers to captured images, and graphics, which refers to synthetic graphics and line art.

Pixel categorization, according to embodiments of the present invention, is determined based on comparing it to pixels surrounding it. A pixel neighborhood is defined to be a window of n×k pixels around the pixel. Based on the assumption that the pixel variance in a graphical element is very low, the center pixel of the neighborhood is said to be a "graphical" pixel if no more than two different pixel values (or other predetermined threshold) exist within the neighborhood.

The threshold number of different pixel values for determining the category of a given pixel depends on the size of the pixel window considered—i.e. the number of pixels within the pixel window), so it may well be possible to set the threshold number of different pixels which categorizes a pixel as a graphical pixel to be, for example 3 or 4, or even higher.

A pixel within a neighborhood with more than two pixel values will be categorized as an "image" pixel.

For example, in order to cope with slow changing graphic values (vignettes), one may consider pixels of "similar" values to be of the same color for categorization purposes. For example, two pixels may be counted as one color if the square Euclidean distance between them is smaller than a predefined threshold value. Any other vector distance test may also be applied.

After pixel categorization was performed and graphical and image elements are identified, "graphical" pixels receive graphical treatment (trapping) whereas "image" pixels receive image treatment (e.g. sharpening).

According to embodiments of the present invention instead of categorizing the page image pixel by pixel, it may be possible to accelerate the process of graphical or image pixel categorization by categorizing tiles of pixels together and make a single categorization decision for all central pixels of the tiles, rather than categorize each and every pixel of the page image.

Figures 4, 5:
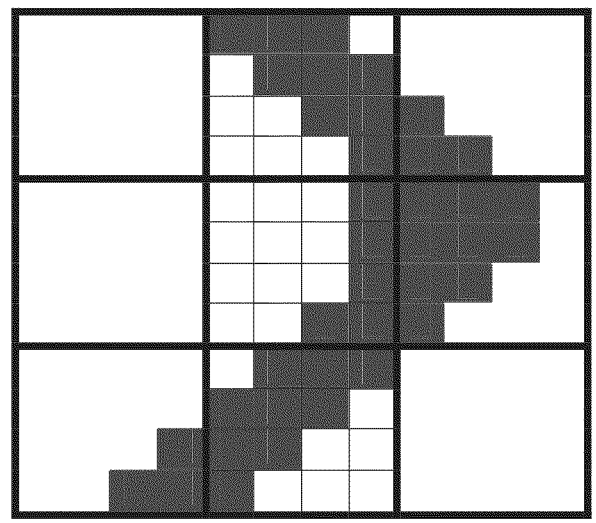
FIG. 4 illustrates a block of 12×12 pixels of a raster page image.
FIG. 5 illustrates a block of 5×5 pixels of a raster page image.

Reference is made to FIG. 4, which illustrates a block of 12×12 pixels of a raster page image. According to embodiments of the present invention an internal tile of 4×4 pixels is categorized by counting different color values of the 12×12 pixels in the surrounding window. A bigger window of 12×12 is considered and a single decision is made for the 16 pixels center tile.

Pre-print enhancement of raster image, according to embodiments of the present invention may be carried out on an image which is compressed using block truncation.

In block truncation, the image is divided into blocks of n×n pixels and the number of pixel values in each block is limited to 2 k. Each block is described by a vector of 2 k pixel values and a vector of n2*k bits describing which of the permitted levels belongs to each pixel. For example, in a 4×4 block of a single color component with 2 permitted levels the block described as B=(CT1, CT0, VECTOR(4×4×1)) when CT1 and CT0 are the two permitted gray levels and the each bit in the vector chooses the pixel value to be either CT0 or CT1. B=(55, 32, 0x0012) describes a block of 4×4 pixels which looks like the C component of the block shown in FIG. 5 (for example A(C, M, Y, K)=(32, 45, 12, 59) B(C, M, Y, K)=(55, 79, 44, 78)). A raster image may be block truncated compressed (BTC) into 2 k permitted colors in one of the following ways:

1. Each block is truncated into permitted multi-dimensional pixel values.

2. Each color component is block truncated separately and the multi-dimensional blocks are described as vectors of color component blocks.

A pre-print enhancement algorithm according to embodiments of the present invention may process blocks instead of single pixels. The neighborhood window is defined as a window of blocks around a central block. All the pixels in the block are classified together. The number of colors is computed faster in the BTC domain and acceleration may be achieved depending on the block size.

Once a block has been identified as an "image" block, it may be subjected to an image enhancement treatment, such as, for example sharpening which is performed in the compressed domain. Sharpening may be performed separately on each color component. A window of blocks around the central block may be averaged, for example, by using a weighted filtering kernel. Each block contributes the average of its truncated levels based on the number of pixels in each level and the weight of the block in the filtering kernel. The detail is then extracted for each of the permitted levels of the central pixel as the distance of the level from the filtered value. This detail is then manipulated to create the desired effect.

Typically, when the detected detail value is smaller than a pre-defined "noise threshold", one may choose to leave it untouched, or may reduce it to "filter out the noise. For detail values above a pre-defined "sharpen-threshold" one may choose not to manipulate these values because they may be determined as sharp enough. For all values in between one may typically increase the detail to make it appear sharper to the eye. Sharpening may also depend on the color component or the color value. One may lower sharpening level for colors within the range of skin tones or sharpen only in the luminance channel if one chooses to do so.

Once a block has been identified as a "graphic" block, one may trap it in the compressed domain.

At this point it is already known that there are only two colors in the categorization block around the central block.

This means that if one breaks the image blocks into separated blocks per color separation, each of the separated blocks has no more than two gray levels. Therefore, one may describe each separation neighborhood in a BTC form of (CTH, CTL, VECTOR) when CTH is the darker level, CTL is the lighter level (which may be the same as CTH) and the vector is a two dimensional array of single bits per pixel in the neighborhood selecting CTH when the bit set to 1 and CTL when the bit is set to 0.

First stage of the algorithm is to identify the dominant color component. This component is the one with the highest opacity and depends on the multiplication of the gray level value by the "density factor" of the separation. Once the dominant separation has been identified, other separations are trapped to it according to predefined rules. The darker pixels of the dominant separation have value CTH(dominant) and correspond to 1's in the VECTOR(dominant). The vectors of all other separation are of one of the following forms:

1. Flat—all 1's or all 0's. In this case there is no need to trap this separation.

2. Same as VECTOR(dominant)—in this case one may get a HALO effect when misregistration occurs.

3. Exact opposite of VECTOR(dominant) (VECTOR(sep) =~VECTOR(dominant))—in this case one may get a GAP effect when misregistration occurs.

Note that any other situation contradicts the two color limitation and the neighborhood would not have been categorized as "graphical".

Now we may negate all the bits of the vector of the trapped separation which are close enough to the edge (transition between 0's and 1's in the two dimensional vector array)—this completes the trapping operation.

Pre-print enhancement according to embodiments of the present invention may be implemented both in hardware or in software or in both, and may either run in real time (at print speed) or off line (as part of job preparation for print).

Figure 6:
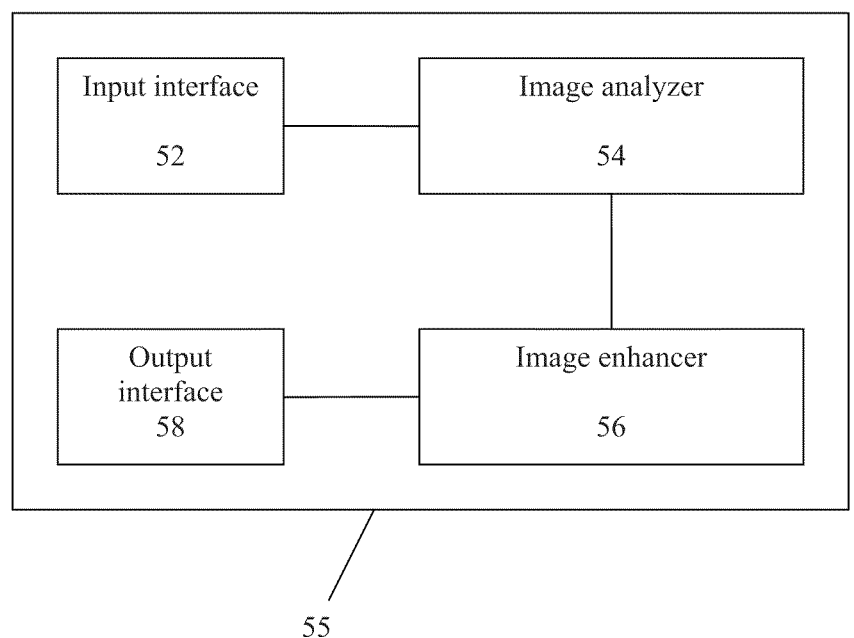
FIG. 6 illustrates a block diagram of an image manipulation system for pre-print enhancement of a raster page image, according to embodiments of the present invention.

FIG. 6 illustrates a block diagram of an image manipulation system for pre-print enhancement of a raster page image, according to embodiments of the present invention.

An image manipulation system, according to embodiments of the present invention may be implemented as software, as hardware or as a combination of hardware and software.

A manipulation system 55 according to embodiments of the present invention may include in input interface 52 for receiving a raster image, communicated for example from a local device or from a remote device over a communication line or network. The manipulation system includes an image analyzer 54, which analyzes the raster image to categorize an element in the raster image as a graphical element or an image element. The manipulation system also includes an image enhancer 56, which is used to apply graphical enhancement to the element categorized as a graphical element, and an output interface 58 for outputting the enhanced image. The enhanced image may be saved locally, or on a remote or mobile storage device, or communicated directly to a local printer via direct communication line or wireless communication, or to a remote printer via a direct or wireless communication line or over a network.

Aspects of the present invention, as may be appreciated by a person skilled in the art, may be embodied in the form of a system, a method or a computer program product. Similarly, aspects of the present invention may be embodied as hardware, software or a combination of both. Aspects of the present invention may be embodied as a computer program product saved on one or more computer readable medium (or mediums) in the form of computer readable program code embodied thereon.

For example, the computer readable medium may be a computer readable signal medium or a computer readable non-transitory storage medium. A computer readable storage medium may be, for example, an electronic, optical, magnetic, electromagnetic, infrared, or semiconductor system, apparatus, or device, or any combination thereof.

A computer readable signal medium may include a propagated data signal with computer readable program code embodied therein, for example, in baseband or as part of a carrier wave. Such a propagated signal may take any of a variety of forms, including, but not limited, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code in embodiments of the present invention may be written in any suitable programming language. The program code may execute on a single computer, or one a plurality of computers.

Aspects of the present invention are described hereinabove with reference to flowcharts and/or block diagrams depicting methods, systems and computer program products according to embodiments of the invention.

What is claimed is:

1. A method for pre-print enhancement of a raster image, the method comprising:
   receiving the raster image;
   performing image analysis on the raster image to categorize an element in the raster image as a graphical element, wherein the performing image analysis includes:
      defining a window comprising a plurality of pixels surrounding the element, each pixel of the plurality of pixels having a value;
      determining a number representing a quantity of different pixel values associated with the plurality of pixels, wherein each pixel value comprises a vector representation of a corresponding pixel of the plurality of pixels, and wherein determining the number representing the quantity of different pixel values includes determining whether a vector distance between the pixel values of the plurality of pixels is smaller than a predetermined threshold value;
      determining whether the number representing the quantity of different pixel values is greater than a predetermined number; and
      in response to determining that the number representing the quantity of different pixel values is greater than the predetermined number, categorizing the element as a graphical element; and
   applying graphical enhancement to the element categorized as the graphical element.

2. The method as claimed in claim 1, wherein performing image analysis on the raster image to categorize the element in the raster image includes categorizing pixels in the raster image.

3. The method as claimed in claim 1, wherein performing image analysis on the raster image to categorize the element in the raster image is carried out in a compressed domain of the raster image.

4. The method as claimed in claim 1, comprising:
   in response to determining that the number representing the quantity of different pixel values is not greater than the predetermined number, categorizing the element as an image element and
   applying image enhancement to the element categorized as the image element.

5. The method as claimed in claim 4, wherein the image enhancement comprises sharpening.

6. The method as claimed in claim 1, wherein applying the graphical enhancement includes applying trapping to the graphical element.

7. A non-transitory computer readable medium comprising instructions that when executed cause a processor to:
   receive a raster image;
   perform image analysis to categorize an element in the raster image as a graphical element, wherein to perform the image analysis, the instructions cause the processor to:
   define a window comprising a plurality of pixels surrounding the element, each pixel of the plurality of pixels having a value;
   determine a number representing a quantity of different pixel values associated with the plurality of pixels, wherein each pixel value comprises a vector representation of a corresponding pixel of the plurality of pixels, and wherein determining the number representing the quantity of different pixel values includes instructions to cause the processor to determine whether a vector distance between the pixel values of the plurality of pixels is smaller than a predetermined threshold value;
   determine whether the number representing the quantity of different pixel values is greater than a predetermined number;
   in response to a determination that the number representing the quantity of different pixel values is greater than the predetermined number, categorize the element as a graphical element; and
   apply graphical enhancement to the element categorized as the graphical element.

8. The non-transitory computer readable medium of claim 7, wherein to perform the image analysis, the instructions cause the processor to categorize pixels in the raster image.

9. The non-transitory computer readable medium of claim 7, wherein to perform the image analysis, the instructions cause the processor to categorize the element in a compressed domain of the raster image.

10. The non-transitory computer readable medium of claim 7, wherein the instructions are further to cause the processor to:
   categorize the element as an image element in response to a determination that the number representing the quantity of different pixel values is not greater than the predetermined number, and apply image enhancement to the element categorized as the image element.

11. The non-transitory computer readable medium of claim 10, wherein to apply image enhancement, the instructions cause the processor to perform sharpening.

12. The non-transitory computer readable medium of claim 7, wherein to apply graphical enhancement to the graphical element, the instructions cause the processor to apply trapping to the graphical element.

13. A system for pre-print enhancement of a raster image, the system comprising:
an input interface to receive the raster image;
an image analyzer to perform image analysis on the raster image to categorize an element in the raster image as a graphical element, wherein to categorize the element the image analyzer is to:
define a window comprising a plurality of pixels surrounding the element, each pixel of the plurality of pixels having a value;
determine a number representing a quantity of different pixel values associated with the plurality of pixels, wherein each pixel value comprises a vector representation of a corresponding pixel of the plurality of pixels, and wherein determining the number representing the quantity of different pixel values, the image analyzer is to determine whether a vector distance between the pixel values of the plurality of pixels is smaller than a predetermined threshold value;
determine whether the number representing the quantity of different pixel values is greater than a predetermined number; and
in response to a determination that the number representing the quantity of different pixel values is greater than the predetermined number, categorize the element as a graphical element; and
an image enhancer to apply graphical enhancement to the element categorized as the graphical element.

14. The system as claimed in claim 13, wherein to categorize an element in the raster image, the image analyzer is to categorize pixels in the raster image.

15. The system as claimed in claim 13, wherein the image analyzer is to perform the image analysis in a compressed domain of the raster image.

16. The system as claimed in claim 13, wherein the image analyzer is to categorize the element as an image element in response to a determination that the number representing the quantity of different pixel values is not greater than the predetermined number, and wherein the image enhancer is to apply image enhancement to the element categorized as the image element.

17. The system as claimed in claim 13, wherein the graphical enhancement comprises trapping.

* * * * *